United States Patent
Korpela et al.

[19]

[11] Patent Number: 6,167,283
[45] Date of Patent: Dec. 26, 2000

[54] CELL SELECTION BASED ON USER PROFILE IN CELLULAR RADIO SYSTEM

[75] Inventors: Mikko Korpela, Raahe; Sami Jutila; Arto Pussinen, both of Oulu, all of Finland; Kari Pirttikangas, Farnborough, United Kingdom; Raino Lintulampi, Kiviniemi, Finland

[73] Assignee: Nokia Mobile Phones Ltd., Finland

[21] Appl. No.: 09/070,956

[22] Filed: May 1, 1998

[30] Foreign Application Priority Data

May 6, 1997 [FI] Finland ................................. 971927

[51] Int. Cl.[7] ................................................... H04B 7/00
[52] U.S. Cl. ......................... 455/525; 455/552; 455/566
[58] Field of Search .................................. 455/524, 525, 455/552, 553, 558, 566, 434, 515, 436

[56] References Cited

U.S. PATENT DOCUMENTS

| | | | |
|---|---|---|---|
| 4,916,728 | 4/1990 | Blair | 379/59 |
| 5,301,359 | 4/1994 | Van den Heuvel et al. | 455/56.1 |
| 5,349,630 | 9/1994 | Sointula | 379/58 |
| 5,612,948 | 3/1997 | Fette et al. | 379/252 |
| 5,722,070 | 2/1998 | Alford | 455/525 |
| 5,778,316 | 7/1998 | Persson et al. | 455/515 |
| 5,784,693 | 2/1998 | Barber et al. | 455/566 |

FOREIGN PATENT DOCUMENTS

| | | |
|---|---|---|
| 0 749 254 A1 | 12/1996 | European Pat. Off. . |
| 0 837 614 A1 | 4/1998 | European Pat. Off. . |
| WO 94/07322 | 3/1994 | WIPO . |
| WO 95/07010 | 3/1995 | WIPO . |
| WO 95/24809 | 9/1995 | WIPO . |
| WO 96/28947 | 9/1996 | WIPO . |

OTHER PUBLICATIONS

English Translation of Finnish Patent Application No. FI–970855.
(European Telecommunication Standard) ETS 300 535(GSM 03.22) "Digital Cellular Telecommunications System(Phase 2); Functions Related to Mobile Station (MS) in Idle Mode".
(European Telecommunication Standard) ETS 300 578(GSM 05.08 Version 4.21.0) "Digital Cellular Telecommunications System (Phase 2); Radio Subsystem link control".
Finnish Search Report.

*Primary Examiner*—Nay Maung
*Assistant Examiner*—Quochien B. Vuong
*Attorney, Agent, or Firm*—Perman & Green, LLP

[57] ABSTRACT

Cellular radio system base stations (10, 12) offer various service levels and transmit control messages (14) indicating said service levels. Terminals (20) store information (22) about previous connections and, based on that information or on their own capability, produce a prediction on the service level required by the next connection. A terminal selects a cell such that the service level in the cell matches the terminal's prediction on the service level required.

18 Claims, 6 Drawing Sheets

CELL SELECTION BASED ON USER PROFILE IN CELLULAR RADIO SYSTEM

FIELD OF THE INVENTION

The invention relates in general to the selection of the cell in which a terminal of a cellular radio system operates. In particular the invention relates to the optimisation of cell selection in a system wherein cells offer various data transfer capabilities and wherein the ability of the terminals to make use of these data transfer capabilities varies from one terminal to another.

BACKGROUND ART

A cellular radio system comprises fixed base stations, each having a certain coverage area, and terminals that can move with respect to the base stations and their coverage areas. The coverage areas are also called cells. This patent application uses mobile phone as an example of a terminal. When a mobile phone is switched on it tries in a way or another to find the strongest base station signal and to register to the so-called location area (LA) represented by the base station in question. Registering means that the mobile phone informs via the base station the mobile telephone network that it can be paged through the location area to which the base station in question belongs. In the idle mode the mobile phone regularly receives messages sent by the base station in order to detect paging messages indicating incoming calls and other messages sent to it. At the same time the mobile phone observes the power of the signals of other nearby base stations in order to be able to quickly change base stations when necessary.

In prior-art cellular radio systems, base stations are substantially alike as regards communications characteristics; in other words a mobile phone receives the same kind of service from the network regardless of the cell in which it is operating. An exception to this rule is made by certain cell prioritising arrangements with which mobile phones are usually directed to operate in cells belonging to a special home area or to avoid certain so-called handover cells. In the home area arrangement a mobile phone is assigned a fixed geographical home area by a contract between the user and the operator maintaining the cellular radio system. When the mobile phone is operating in a home area cell, it is allowed a discount for the normal call tariff or other advantages.

In prior-art cellular radio systems, also the terminals are very much alike as regards communications characteristics. A system usually specifies only one kind of air interface the specifications of which relate to transmission and reception timing available frequencies, and the data transfer rate, or bit rate, as it is called.

Cell selection functions in the GSM (Global System for Mobile Telecommunications) and its extension DCS 1800 (Digital Communications System at 1800 MHz) are specified in standards ETS 300 535 (GSM 03.22) and ETS 300 578 (GSM 05.08) by the EBU (European Broadcasting Union) and ETSI (European Telecommunications Standards Institute). On a general level the same approach can also be applied in other digital cellular radio systems. Cell selection is also discussed in Finnish patent application FI-970855 (Nokia Mobile Phones Oy). Cell selection may also be called base station selection since the radio communications of each cell are handled by a certain base station.

In studies of a new kind of mobile communications system called the third-generation mobile communications system it has been discovered that known methods cannot always control the cell selection in the best possible manner. Third-generation systems include the UMTS (Universal Mobile Telecommunication System) and FPLMTS/IMT-2000 (Future Public Land Mobile Telecommunication System/International Mobile Telecommunications at 2000 megahertz). It is planned that in the new systems mobile terminals will have 3 to 4 operating environments, which can be characterised according to the cell size and the mode of movement or location of the terminal. The operating environments are: vehicular environment (macro cells, kilometers), pedestrian environment (microcells, hundreds of meters), office environment (nano and/or picocells, meters) and possibly satellite environment (megacells, hundreds of kilometers). The latter means that the base station communicating with the terminal is located on a satellite or that the base station is terrestrial but there is a satellite link between it and the terminals. In different operating environments the cell size and terminal mobility provide different possibilities of implementing error-free communications which is reflected in the bit rates. The office environment may offer communications at up to 2 Mbit/s, whereas in the vehicular environment you'll probably have to be satisfied with a maximum of 144 kbit/s.

If every terminal always tries to choose the cell offering the fastest possible communications, it is likely that terminals are directed to "fast" cells in such great quantities that their simultaneous random access requests cause a collision and a connection failure. When a connection to a first base station has been established and the terminal and first base station have agreed on a certain service level, the connection can be handed over to a base station which has a cell that is at least partly overlapping with the cell of the first base station and in which the capacity situation better allows the connection in question. However, handovers increase the signalling load of the network, so it would be better if the connection could be established with a suitable base station from the start.

From patent document U.S. Pat. No. 4,916,728 (Blair) there is known a method in which a mobile phone can operate in networks of several operators. In order to be able to select the most advantageous network, a mobile phone goes through several reception frequencies, decodes from the signals it has received the system identification (SID) codes, and tunes in at the frequency the SID code which indicates the most advantageous operator. Data for the different operators have been stored in the mobile phone's memory, so in this arrangement various mobile phones respond to the information sent by the base stations in various ways. However, as all base stations in the network of a given operator send out the same SID code, mobile phones in this method cannot be made to operate in different ways except for the selection of the operator.

PCT patent document WO-95/24809 (Motorola Inc.) deals with a system in which a switching centre uses an identifier sent by a mobile terminal to decide whether the mobile terminal is entitled to a certain service in a given area. If there are geographical and/or mobile phone specific restrictions on the service, the switching centre may either refuse to offer any services to the mobile phone in that area or allow the use of a specific service, such as the data transfer service, for example. However, in order to change the supply of allowed services, the mobile phone has to be moved since the restrictions are always the same in a certain area. So, in this method it is not possible to affect the cell selection or re-selection when the mobile phone or other terminal of a cellular radio system is stationary.

What is known from Finnish patent application FI-952965 and from the corresponding European patent document EP-749 254 Al (Nokia Mobile Phones Oy) is a multiple-level home area pricing method for a mobile phone of a cellular radio system wherein a binary character sequence is stored in the mobile phone. Each base station sends at regular intervals a special binary identification code of its own and the mobile phone uses said stored binary character sequence as a mask to select from the character sequence sent by a base station certain bits for a logic operation. If said logic operation produces the right result, the mobile phone concludes that it is located in the home area or in another area where a certain territorial service is enabled. Using different logic operations it is possible to form several separate or mutually hierarchical areas in which the mobile phone is given different services by the cellular radio system. Again, this is a method that is not very suitable for cell prioritisation because the services are territorial and the service supply changes only when the mobile phone moves.

In addition to the methods mentioned above several methods and systems are known in which a mobile phone or other cellular radio system terminal can detect whether or not it is operating in a device-specifically prioritised cell and inform the user about the fact. However, no prior-art system is able to direct terminals to use a suitable cell if there are available cells that have different capacities.

SUMMARY OF THE INVENTION

It is an object of this invention to provide a method and apparatus for optimising cell selection in mobile terminals when there are available cells of different capacities and/or when the capability of the terminals to make use of the different services of the cells varies from one terminal to another.

The objects of the invention are achieved by compiling statistics on communications events and anticipating the next connection on the basis of the compiled statistical data and/or the characteristics of the terminal.

The method according to the invention is characterised in that it comprises stages in which a terminal receives from base stations of cells of a cellular radio system information about the service levels offered by them, the terminal predicts what kind of service level will be needed in the next connection, and the terminal selects a cell in which the service level offered by the base station matches the prediction made by the terminal.

The invention is also directed to a terminal of a cellular radio system, characterised in that it comprises an arrangement to make a prediction about the service level needed in the next connection and an arrangement for cell selection such that in the selected cell the service level offered by the base station matches said prediction.

In addition, the invention is directed to a cellular radio system characterised in that it comprises at least in one base station means for sending control messages indicating the service level offered by the base station in question and at least in one terminal an arrangement for making and storing on a memory medium a prediction about the service level probably needed in the next connection, and an arrangement for selecting a cell on the basis of a comparison between the prediction stored on the memory medium and the service level offered by the base station.

Base stations transmit at regular intervals control messages which are directed to all terminals within the cell area and which include information about the base station and its operation. Such a control message can be used to convey information about the bit rate offered by the cell as well as other factors defining the capacity of the base station. A terminal selects from overlapping cells the one that offers a bit rate which matches the terminal's prediction about the bit rate needed by the user next time. Preferably the prediction is based on a user profile, i.e. statistics on previous connections and the bit rates used in them. The prediction also represents the terminal's own capability of using the different service levels offered by the base stations. Cell selection is determined on the basis of the most limiting factor of these three: the user, the terminal and the network. The user as a limiting factor means that the user previously has used the possibilities offered only to a limited extent, whereby the user profile indicates that in the next connection probably only a modest service level will be needed. The terminal as a limiting factor means that if the terminal is unable to use the service level of the best base stations, i.e. those offering the highest service levels, the system will primarily attempt to select a cell in which the service level offered by the base station does not exceed the level that the terminal is capable of using. The network as a limiting factor means that if there are available only cells offering modest service levels, the system attempts to select the one that best matches the user profile and terminal capability.

BRIEF DESCRIPTION OF THE DRAWINGS

The invention is described in more detail with reference to the preferred embodiments presented by way of example and to the accompanying drawings where.

DETAILED DESCRIPTION OF THE PREFERRED EMBODIMENTS

Figure 1:
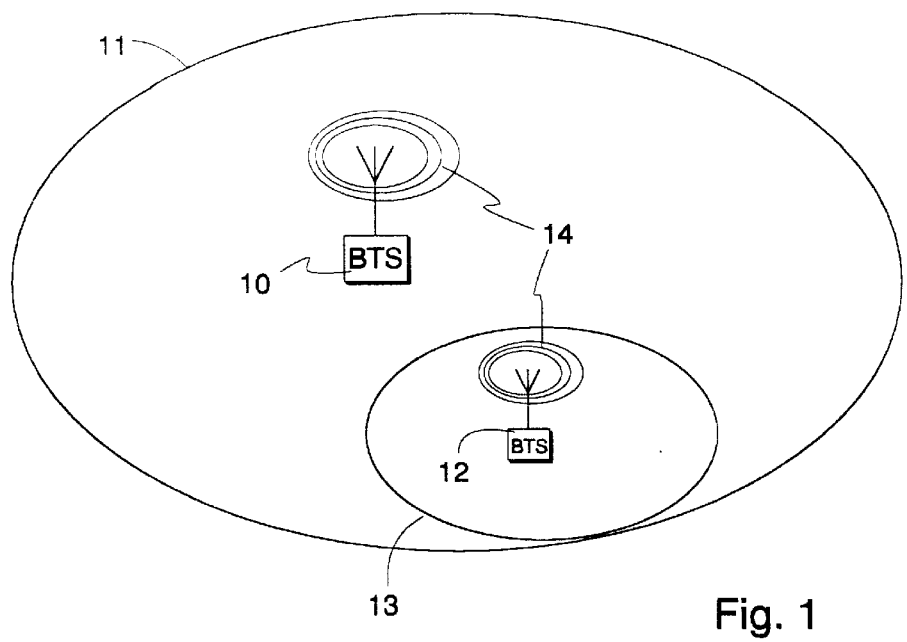
FIG. 1 shows base station subsystems and control messages.

In FIG. 1, a first base transceiver station 10 (BTS) acts as a base station for a macro cell 11, offering to terminals a bit rate of 144 kbit/s, at the most, in a single data connection. A second base transceiver station 12 is an office system base station in a picocell 13, offering to terminals a bit rate of 2048 kbit/s, at the most, in a single data connection. Both base stations transmit at regular intervals a control message 14, which, in addition to other data, includes information about the base station's service supply, i.e. what kind of services terminals can use via the base station.

An exemplary factor concerning the service supply of a base station is the maximum bit rate offered by the base station. Base stations can be divided according to cell size into pico-, micro-, macro and megaclasses so that a base station of a given class offers a bit rate typical of that class. The invention does not restrict the number or definitions of the different classes. The class information can be conveyed in many ways in a control message sent by the base station. In the classification based on cell size a practice can be applied wherein value "00" of a certain two-bit field indicates a picocell, value "01" indicates a microcell, value "10" indicates a macro cell, and value "11" indicates a megacell. The classes may also directly indicate the maximum bit rate offered by the base station, e.g. as in the table below:

TABLE 1

Example of base station classification

| name of class | maximum bit rate |
| --- | --- |
| class 1 | 64 kbit/s |
| class 2 | 144 kbit/s |
| class 3 | 384 kbit/s |
| class 4 | 512 kbit/s |
| class 5 | 1024 kbit/s |
| class 6 | 2048 kbit/s |

It is not essential in what form or on which channel the base station class information is conveyed to the terminals. When using the classification according to Table 1, the GSM phase 2+ base stations can offer services also to future multimode terminals as class 1 or 2 base stations. "Multimode terminal" refers to a terminal that can act as a terminal of more than one cellular radio system. according to the services available in the different systems.

Figure 2:
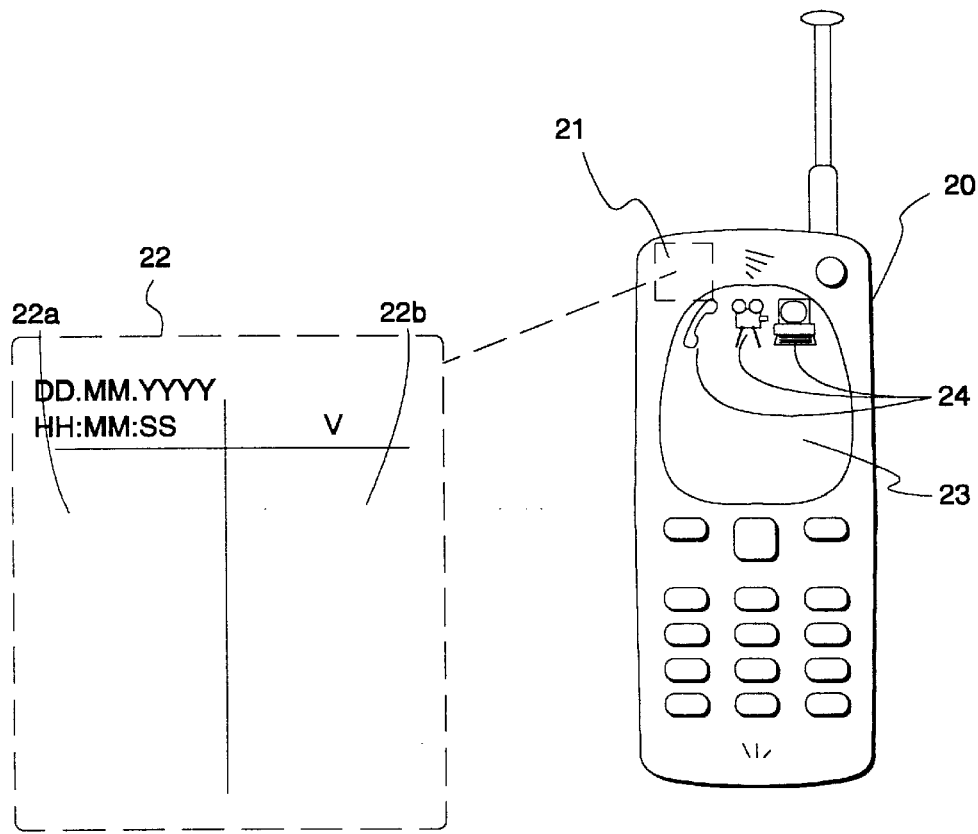
FIG. 2 illustrates compilation of statistics performed by a terminal.

FIG. 2 schematically shows a terminal 20 that includes the user's personal SIM (Subscribed Identity Module) card 21. The SIM card is a known small-sized memory medium which stores in electrical form information about the user and his mobile subscription. In accordance with the invention, the terminal 20 stores on the SIM card 21 or other memory medium accessed by the terminal 20 information about connections realised between the terminal and base stations. Information stored may relate to the class of the base station used, type of connection (voice, video, data, other), service level (bit rate and such), special services used and/or another factor that represents services used in the connections. On the SIM card the information remains even when power is turned off at the terminal; if the information is stored in the terminal's non-permanent memory, it disappears when power is turned off. In FIG. 2 this information is shown as a table 22 containing a time column 22a which stores the time of the connection, and a bit rate column 22b which stores the bit rate used by the connection. For clarity, the figure only shows a very simple table. The size of the memory space available determines for how many connections information can be stored in the table 22 and what information is stored in the table for each connection. The more there are connections for which information is stored in the table, the broader the statistical material on the basis of which the terminal can predict what kind of connection the user will be needing next. On the other hand, it may be advantageous to store information on only a limited number of the most recent connections as the latest connections best represent the user's current connection needs and the statistical data then quickly adapt to a new situation if the user changes his habits. The data in the table 22 can be called a user profile.

In addition to the amount of data stored in the table, also the prediction algorithm has an effect on the prediction. One exemplary algorithm is to calculate the average of all values of column 22b, said average representing the mean bit rate of all realised connections. The algorithm produces the computed average as the prediction, so it is assumed that the bit rate needed in the next connection equals the average of the bit rates of the previous connections. If desired, the most recent connections can be mathematically weighted in the calculation of the average. If the average falls between values representing certain existing bit rates, it usually pays to select as prediction the next value that is higher than the computed value and which corresponds to an existing bit rate value (e.g. a value in the column on the right-hand side of Table 1). Instead of the average, the prediction may be based on the typical value of the values in column 22b, i.e. the bit rate that has been used the most. Other, alternative approaches can also be disclosed. The invention does not limit the algorithm for calculating the prediction but a suitable algorithm can easily be chosen by experimenting. The algorithm may also be a learning one, which means the calculation of the prediction is influenced by the fact of how successful the previous predictions have been and by perceived regularity of the user's connection needs.

In the embodiment according to FIG. 2 terminals follow these principles in cell selection:
a) as a terminal is switched on, it registers via a suitable base station, the invention does not limit the selection of base station at this stage,
b) in idle state, the terminal attempts to camp on a cell wherein the maximum available bit rate v indicated by a control message sent by the base station satisfies the condition $$v = \left\{ \min_{i \in [1,n]} (v_i) \middle| v_i \geq T \right\},$$

where T is the prediction calculated by the terminal, and the base stations that the terminal is able to receive are numbered 1 to n,
c) the terminal tries to avoid cells that have bit rates higher than what the terminal will be needing according to the prediction; when within such a cell the terminal attempts to select another cell,
d) the terminal tries to avoid cells that have bit rates higher than what the terminal is capable of, when within such a cell the terminal attempts to select another cell, and
e) a terminal which is not in an optimal cell according to its capability (such as its maximum bit rate) and the prediction it has calculated attempts to select another cell.

As regards the invention, it is not essential what particular kind of algorithm is used to implement in the terminal the principles laid out above. Neither is it necessary for the algorithm to realise all the principles a) to e) presented above to be included within the scope of the invention since any one of conditions b) to e) alone realises the inventional idea according to which cell selection is based on a user profile formed on the basis of earlier connections, capability or the terminal and/or on the service level offered by the base stations available.

Figure 6:
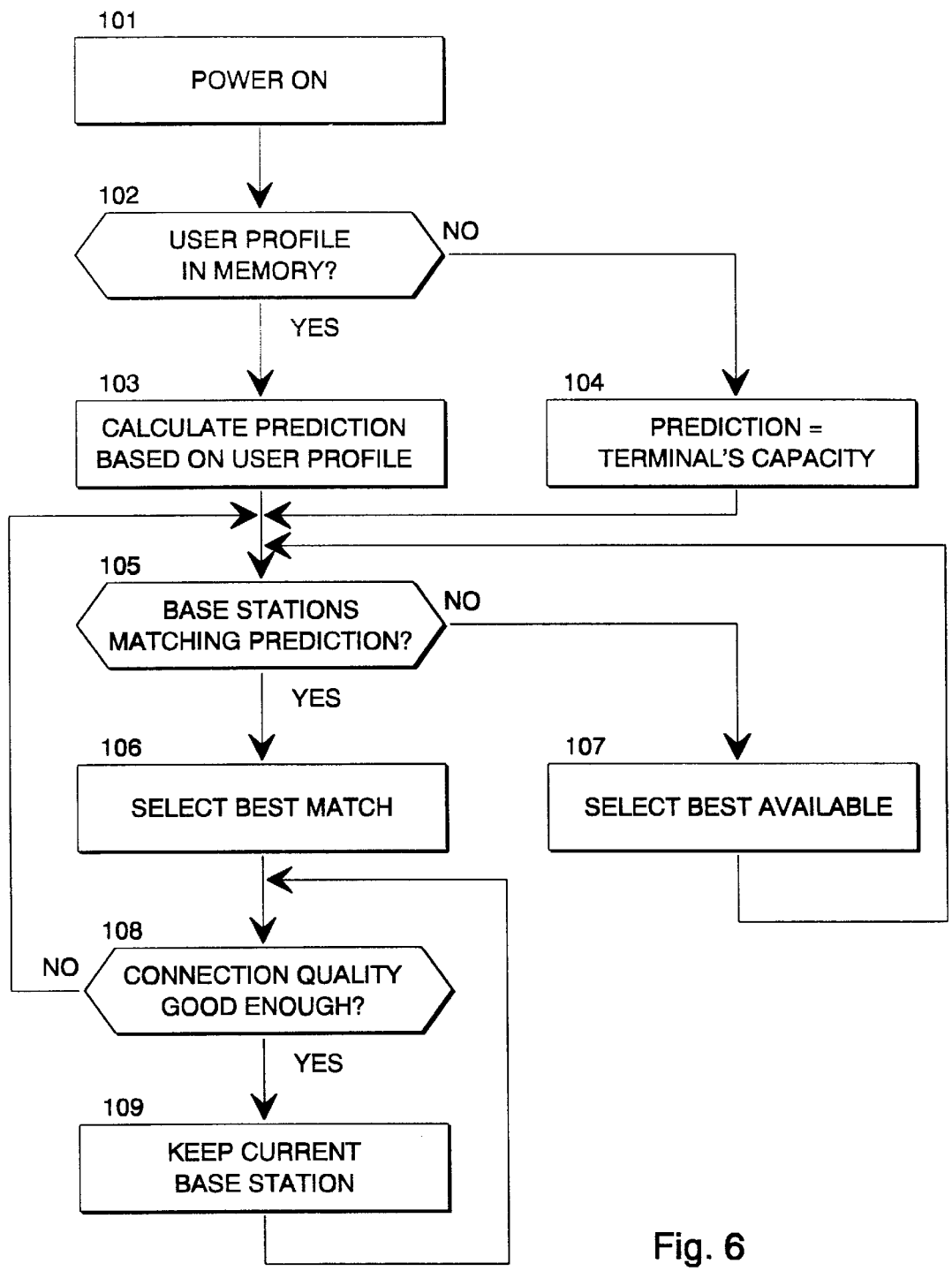
FIG. 6 shows a method according to an embodiment of the invention.

FIG. 6 illustrates an embodiment of the method according to the invention, applying all above-mentioned features a to e. In step 101 the terminal is switched on. In step 102 the microprocessor, which controls the operation of the terminal, checks whether there is in the memory a user profile representing earlier connections. If yes, a prediction on the service level needed for the next connection is calculated on the basis of the user profile in step 103. If there is no user profile in the memory, a value representing the terminal's capability, such as the maximum bit rate of the terminal, is fetched in step 104, and the prediction equals that value. In step 105 it is checked whether the base stations the transmissions of which the terminal is able to receive include one that matches the prediction. If yes, the terminal selects in step 106 the base station that best matches the prediction. If not, the terminal selects in step 107 the best base station available and remains cycling the loop of steps 105 and 107 until it finds at least one base station matching the prediction. In step 108 the terminal, which has selected a base station according to the prediction, monitors the quality of the connection. If the connection with the selected base station becomes too weak, the terminal returns to step 105 in order to find a new base station. If, however, the quality of the connection remains good, the terminal keeps cycling the loop formed by steps 108 and 109. The operation is interrupted when the terminal is switched off, which is not shown in the diagram.

Figure 3:
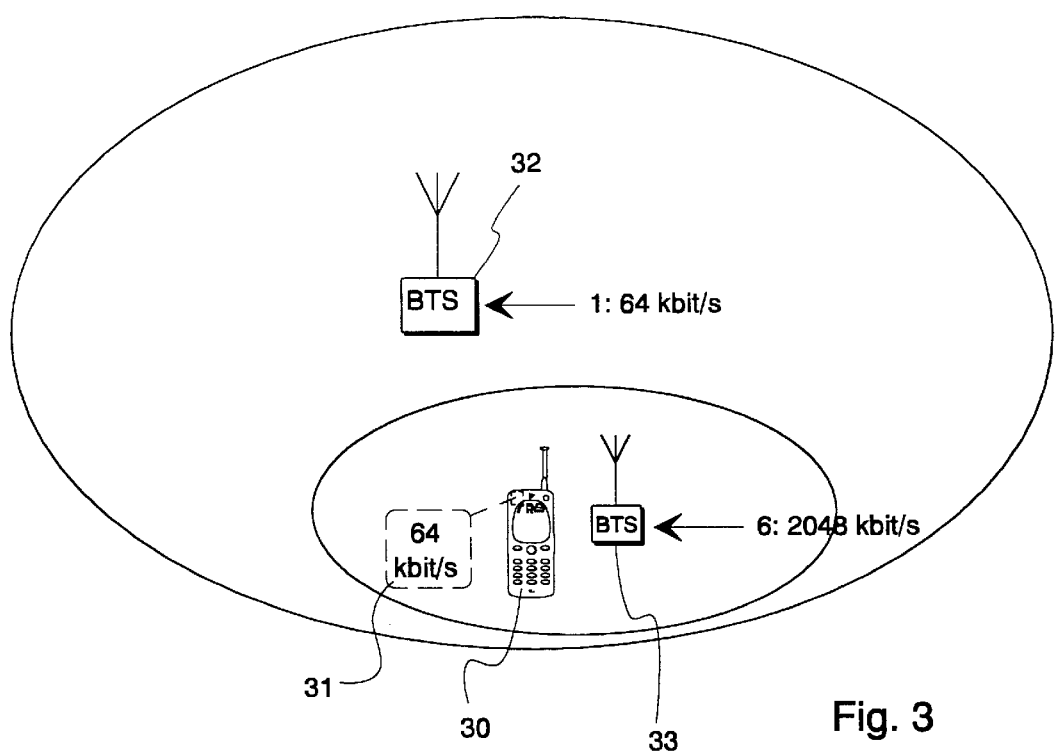
FIG. 3 shows an example of operation according to an embodiment or the invention.

An example of base station selection (or, cell selection) is provided by the situation according to FIG. 3, wherein a user's terminal 30 is a complete third-generation cellular radio system terminal capable of up to a 2048-kbit/s bit rate in high-speed data transfer, but the user needs his apparatus mainly for making ordinary phone calls. The terminal compiles according to table 31 data on the connections established by the user, so that the data indicate that most of the connections made by the user are ordinary phone calls using a 64-kbit/s bit rate at the most. While in idle mode the terminal attempts according to principle c) described above to select a base station 32 that belongs to class 1 in the classification of table 1. That cell may even be a cell complying with the current GSM phase 2+, so that in spite of the new terminal the user employs the GSM system and not the new third-generation cellular radio system where base station 33 would offer a 2048-kbit/s bit rate. In this example, the limiting factor for the cell selection is the user, whose earlier choices are represented in the user profile.

Figure 4:
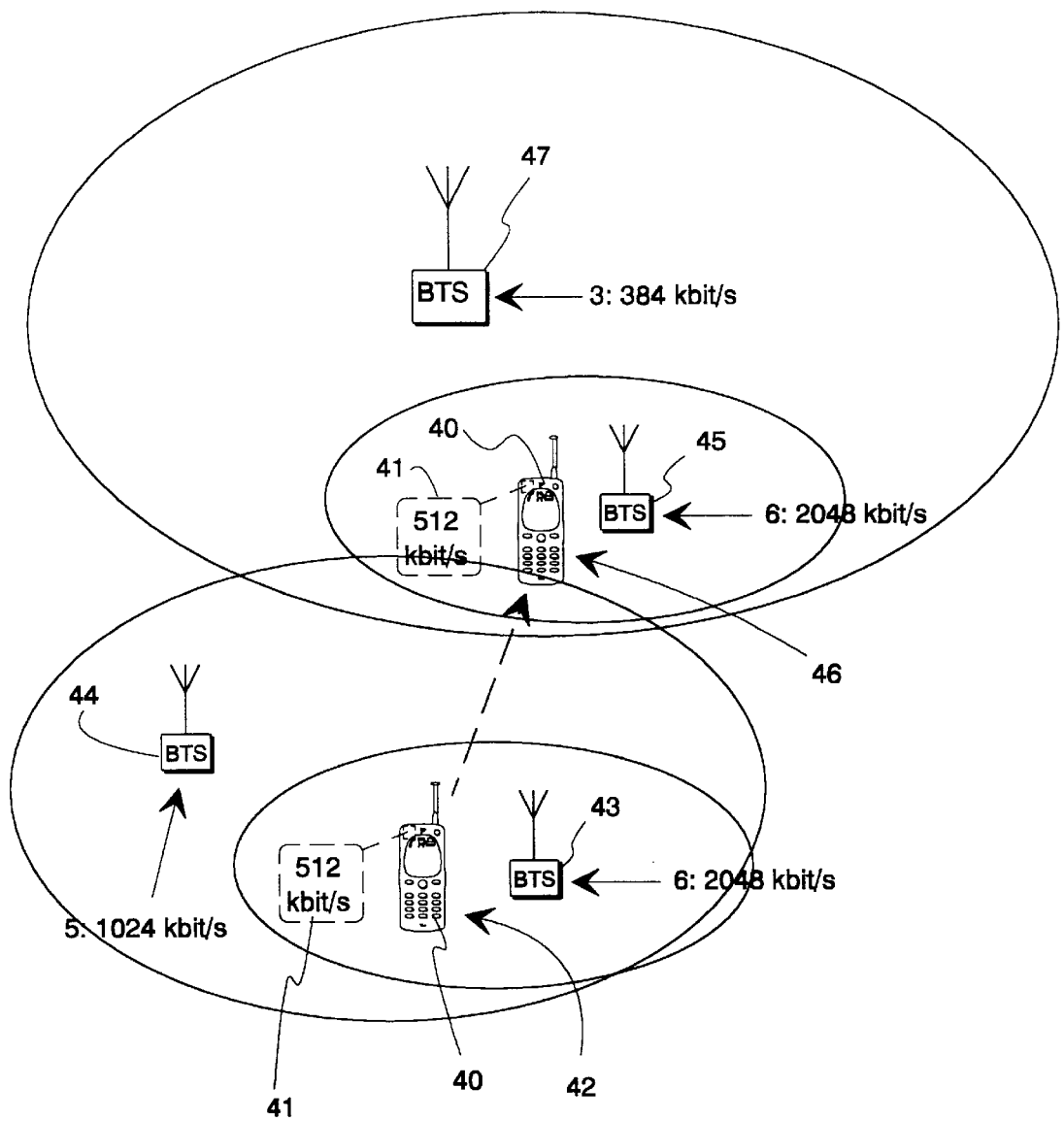
FIG. 4 shows an example of operation according to a second embodiment of the invention.

FIG. 4 illustrates another exemplary situation wherein a terminal 40 does not compile a user profile as such, but applies to cell selection information 41 stored in its memory concerning the capability of the terminal in accordance with item d) presented above. If, for example, the terminal is capable of a maximum bit rate of 512 kbit/s, it selects primarily a cell that belongs to classes 1 to 4 in the classification according to Table 1. At spot 42 there are available only base stations 43 and 44 belonging to classes 5 and 6 so that the terminal 40 selects one or them lest the user is left entirely without communications services. All the time the terminal is trying to find a cell that belongs to one of classes 1 to 4. At spot 46 the terminal detects, in addition to base station 45 of class 6, the transmission of base station 47 belonging to class 3 and changes over to the cell of that base station 47. So, in this example the limiting factor in the cell selection is the terminal's capability.

Figure 5:
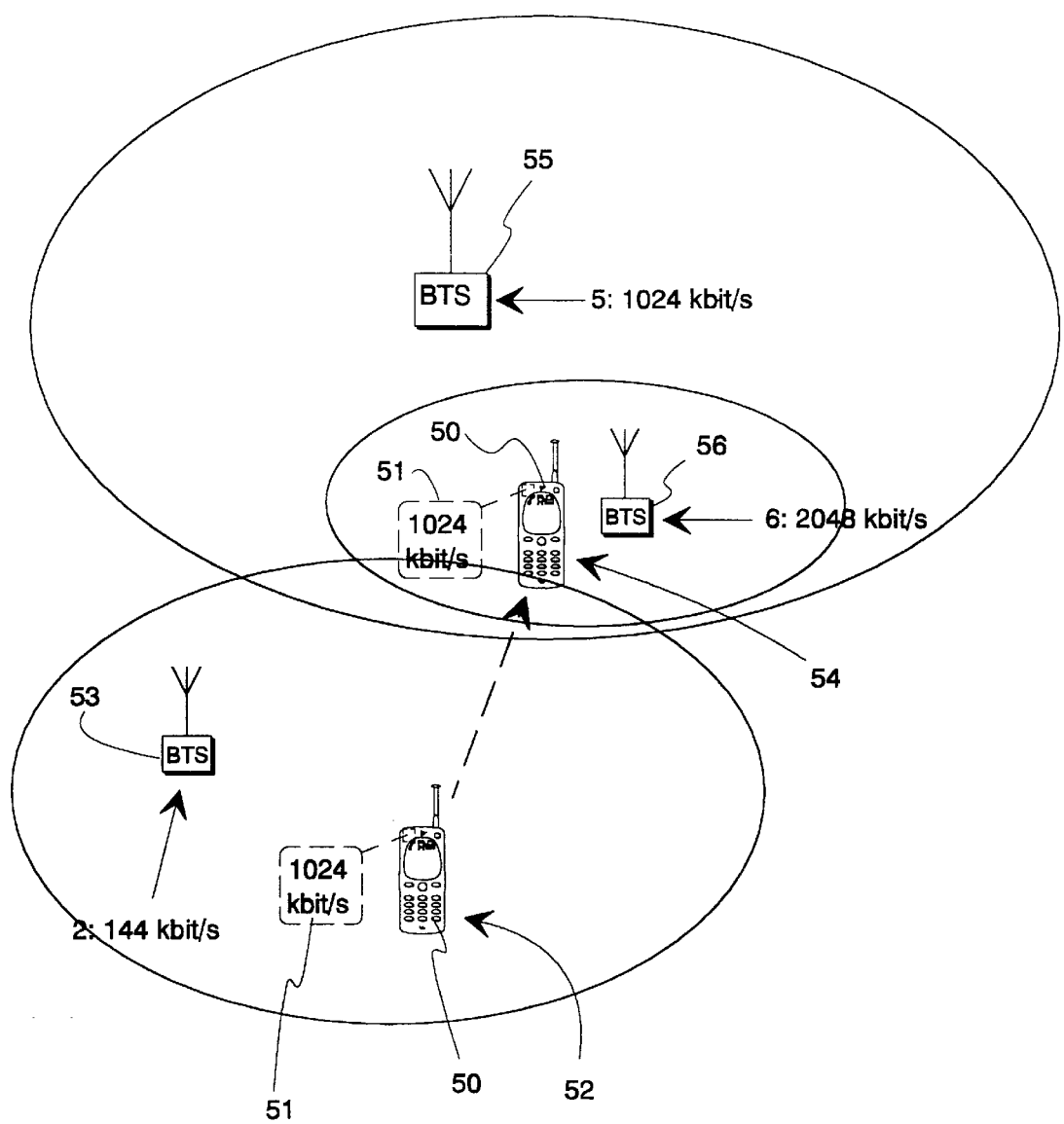
FIG. 5 shows an example of operation according to a third embodiment of the invention.

FIG. 5 provides a third example illustrating a situation in which either the user profile 51 compiled by a terminal 50 or the terminal capability information stored in the terminal's memory predicts that the bit rate which will be needed in the next connection corresponds to base station class 5 (bit rate 1024 kbit/s) according to Table 1 presented above. At spot 52. however, there is only available a class-2 base station 53, so the terminal 50 selects it. The limiting factor in the cell selection is now the network, more specifically the location of the coverage areas of its different-level base stations in the operating area of the terminals. When the terminal 50 has moved over to spot 54 where there are available a class-5 base station 55 and a class-6 base station 56, the terminal selects the former one.

Since a terminal in the idle state knows the current cell's maximum bit rate, it can convey that piece of information to the user, too. In FIG. 2, the display 23 of the terminal 20 may include selectably activated symbols 24 or other notifications to the user concerning the maximum bit rate of the current cell. Instead of numbers representing the bit rate or text describing the connection type it may be more illustrative to use simple graphic symbols depicting an ordinary phone, video camera and computer, for example.

Figure 7:
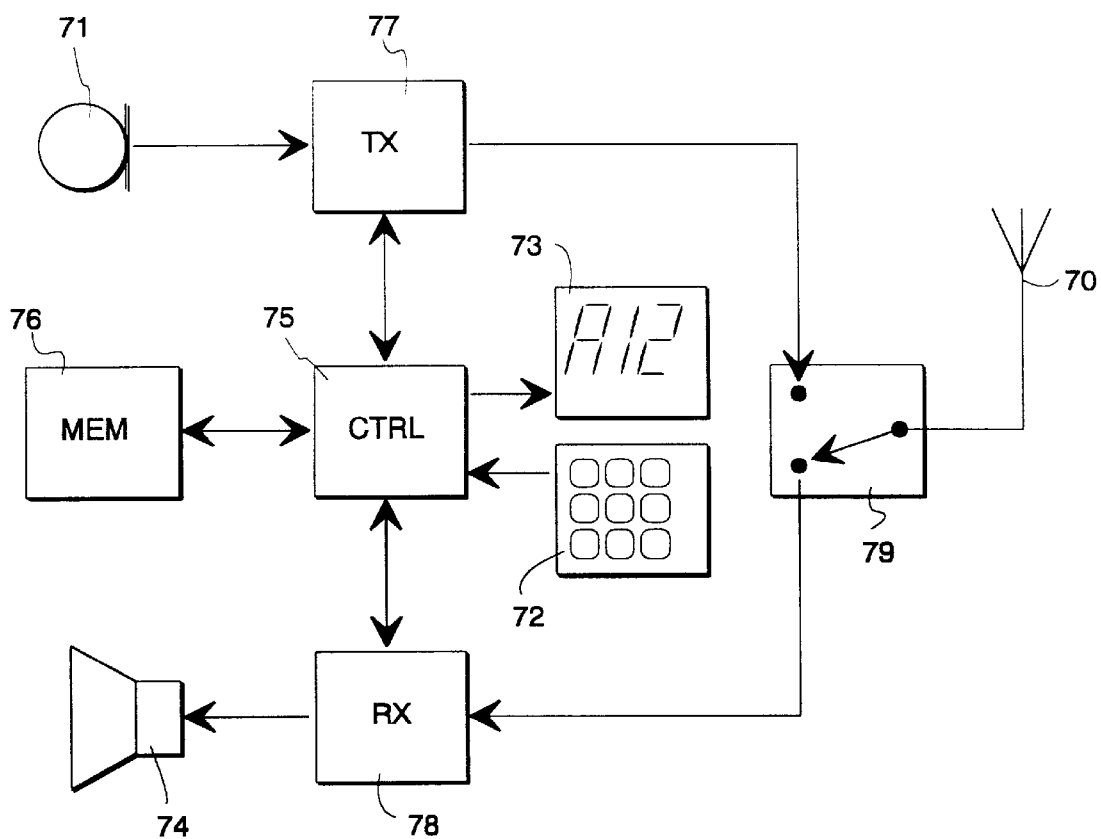
FIG. 7 shows a cellular radio system terminal according to an embodiment of the invention.

FIG. 7 shows the structure of a cellular radio system terminal that can be used in a cellular radio system according to the invention. The terminal comprises parts typical of prior-art mobile communications devices, such as a microphone 71, keypad 72, display 73, earphone 74, antenna 70, antenna switch, or duplex switch 79, and a control block 75 that controls the operation of the terminal. The control block 75 can be typically realised using a microcontroller unit (MCLJ) or digital signal processor (DSP). In addition, FIG. 2 shows a transmission block 77 and reception block 78, which in the terminal shown in FIG. 7 are more versatile than in terminals of the second-generation digital cellular radio systems; for example, they are capable of transferring data at several different bit rates. From the plans aiming at third-generation cellular radio systems it is known to one skilled in the art how such more versatile transmission and reception blocks are implemented. The transmission block 77 comprises speech encoding, channel encoding, scrambling and modulation as well as the transmission RF functions. Correspondingly, the reception block 78 comprises the reception RI, functions, demodulation, descrambling, channel decoding and speech decoding. If video phone functions are added to the terminal shown in the figure, the transmission block 77 has to have, in addition to speech encoding, also video encoding that receives video image from a camera connected to the apparatus; and the reception block 78 has to have video decoding that directs the decoded video image to a display 73 or to a separate video display (not shown). The control block 75 also controls the terminal's user interface.

In the terminal according to FIG. 7, the invention primarily relates to the operation of the control block 75 and memory 76. Information about the terminal's capability has been programmed into the terminal's memory 76 before the terminal was taken into use. The control block 75 compiles data representing realised connections and stores them as a user profile in the memory 76. Controlled by the control block 75 the terminal receives control messages from different base stations via the antenna 70, duplex switch 79 and reception block 78. When a prediction is needed for the next probable service level the control block 75 reads user profile data (or terminal capability information) from the memory 76 and computes the prediction. Registering and handover requests are transmitted by the terminal via the transmission block 77, duplex switch 79 and antenna 70, controlled by the control block 75.

The maximum bit rate offered by a base station in the cell in which the terminal is located, or the maximum bit rate in any one of the cells that the terminal may select at any given time, is not necessarily the same as the terminal's prediction on the bit rate that will be needed next. Some users may be interested in knowing the prediction computed by the terminal and whether it is close to the available resources. A function may be programmed at the terminal with which the user can check what the terminal's prediction on the next bit rate is. The user may even be offered a chance to manually alter the prediction.

The prediction computed by the terminal may not always be valid. A user who has for long made only ordinary phone calls may suddenly want to make a video call or establish a high-speed data connection. Then the terminal has probably selected on the basis of its prediction a cell that has a capacity too low for the connection needed by the user, which means the terminal must quickly select a new cell if one is available. To that end, the terminal preferably receives and stores data that represent the data transfer capacities of other cells in the neighbourhood. On the basis of the data stored the terminal can quickly change cells according to need.

Above we used almost solely the bit rate as the cell specific variable parameter, describing e.g. how a terminal monitors on the basis of a user profile compiled by it the distribution of the bit rates needed and performs the cell selection accordingly. However, the invention can be generalised to apply to any cell specifically varying factor, such as the availability of certain services. If a service is available only via certain base stations, the terminal may monitor whether the user uses that service often and on the basis of the results from the monitoring either avoid or favour the base stations offering that particular service. All base station specific factors belonging to the scope of the invention on which cell selection may be based can be collectively called the "service level".

What is claimed is:

1. A method for a terminal to select a cell in a cellular radio system, comprising the steps of
   receiving from a multitude of base stations of a cellular radio system information about the service levels offered by said base stations,
   producing a prediction about what kind of service level will be needed for the next connection between the terminal and a base station, and
   selecting a cell in which the service level offered by the base station corresponds to the prediction produced by the terminal.

2. The method of claim 1, further comprising the steps of
   selecting at switch-on a cell on a predetermined first basis and
   reconsidering the cell selection by said terminal on the basis of whether the service level offered by the base station of the first selected cell matches the prediction produced by the terminal.

3. The method of claim 1, wherein at the step of selecting a cell the terminal selects a cell in which the service level offered by the base station is at least as good as the service level required by the prediction produced by the terminal but at the same time the lowest among the service levels of those base stations the transmissions of which the terminal is able to receive and the service level offered by which is at least as good as the service level required by the prediction produced by the terminal.

4. The method of claim 1, further comprising the step of indicating to the user the service level offered by the cell selected by the terminal.

5. The method of claim 1, wherein the terminal stores information about previous connections between it and the base stations of the cellular radio system and produces said prediction in such a manner that it corresponds to the typical connection as defined by the information about the previous connections.

6. The method of claim 5, wherein the terminal stores said information on a memory medium which is one of the following: a SIM card, a memory circuit providing semi-permanent storage.

7. The method of claim 1, wherein the terminal uses as said prediction the information about the maximum service level it itself is able to utilise.

8. The method of claim 7, wherein in a situation where the information received by a terminal on the service levels offered by base stations indicates that the service levels of all the base stations in question exceed the level which the terminal is able to utilise, the terminal selects a cell in which the service level offered by the base station is higher than the level which the terminal is able to utilise and then attempts to change to a cell wherein the service level offered by the base station is not higher than what the terminal is able to utilise.

9. A terminal of a cellular radio system, comprising
   means for receiving control messages transmitted by base stations,
   means for selecting a cell,
   memory means,
   an arrangement for producing a prediction on the service level needed in the next connection and
   an arrangement for selecting a cell such that in the selected cell the service level offered by the base station matches said prediction.

10. The terminal of claim 9, further comprising indicating means for conveying to its user service level notifications based on control messages sent by cellular radio system base stations.

11. The terminal of claim 10, wherein said indicating means comprise a display and graphic symbols depicting different service levels to be selectably displayed on said display.

12. The terminal of claim 9, wherein said arrangement for producing a prediction comprises means for storing information about previous connections between the terminal and the base stations of the cellular radio system.

13. The terminal of claim 12, wherein the predictions are produced so that they correspond to a typical connection as defined by the information about previous connections.

14. The terminal of claim 9, wherein information about a maximum service level that the terminal is able to utilize is used to produce said prediction.

15. A cellular radio system, comprising
   terminals.
   base stations offering various service levels
   at least in one base station means for transmitting control messages describing the service level of the base station in question, and
   at least in one terminal
      an arrangement for producing and storing on memory means a prediction on the service level most likely needed in the next connection between it and a base station, and
      an arrangement for selecting a cell on the basis of a comparison between
         the prediction stored on the memory means and
         the service level offered by the base station.

16. The system of claim 15, wherein said arrangement for producing a prediction comprises means for storing information about previous connections between the terminal and the base stations of the cellular radio system.

17. The system of claim 16, wherein the predictions are produced so that they correspond to a typical connection as defined by the information about previous connections.

18. The system of claim 12, wherein information about a maximum service level that the terminal is able to utilize is used to produce said prediction.

* * * * *